United States Patent [19]
Mitchell

[11] Patent Number: 5,228,533
[45] Date of Patent: Jul. 20, 1993

[54] KNOCKDOWN MOTORIZED SCOOTER

[75] Inventor: Roger Mitchell, Richmond Hill, Canada

[73] Assignee: Genus Medical Inc., Concord, Canada

[21] Appl. No.: 634,564

[22] Filed: Dec. 27, 1990

[51] Int. Cl.$^5$ .................. B62K 15/00; B62D 61/08
[52] U.S. Cl. .................................... 180/208; 180/216
[58] Field of Search ............... 180/208, 907, 216, 217, 180/65.1; 280/DIG. 5, 46, 287; 297/DIG. 4

[56] References Cited

U.S. PATENT DOCUMENTS

| | | |
|---|---|---|
| 3,369,629 | 2/1968 | Weiss . |
| 4,340,124 | 7/1982 | Leonard . |
| 4,452,327 | 6/1984 | Mowat . |
| 4,570,739 | 2/1986 | Kramer . |
| 4,666,008 | 5/1987 | Shepard . |
| 4,750,578 | 6/1988 | Brandenfels . |
| 4,892,166 | 1/1990 | Gaffney . |
| 4,944,359 | 7/1990 | Doman . |
| 4,944,360 | 7/1990 | Sturges . |
| 4,947,955 | 8/1990 | Hopely . |

FOREIGN PATENT DOCUMENTS 936108  9/1963  United Kingdom ......... 280/DIG. 5

OTHER PUBLICATIONS

Amigo Products, "Product Selection Guide".
Jubilee Scooters "California Comfort".
Everest & Jennings "Carrette-Freedom Machine".
Unicare Products "The Condor".
Harwill Mobility "The Coyote".
Harwill Mobility "PaceSaver Plus II".
ABEC Mobility "I Get Around".
Ortho Kinetics "Discover the Difference ...".
Ranger All Season "Sold".
Invacare Corp. "Tri-Rolls".
Fortress Scientific "The 2000 Family".
Dignified Products "This is the Only Chauffeur ...".

Primary Examiner—Karin L. Tyson
Attorney, Agent, or Firm—Thomas A. O'Rourke

[57] ABSTRACT

A scooter that may be easily assembled and assembled without requiring lifting any heavy parts. The scooter may be easily broken down into a main frame, a drive portion, a motor portion and a power transmission portion.

8 Claims, 19 Drawing Sheets

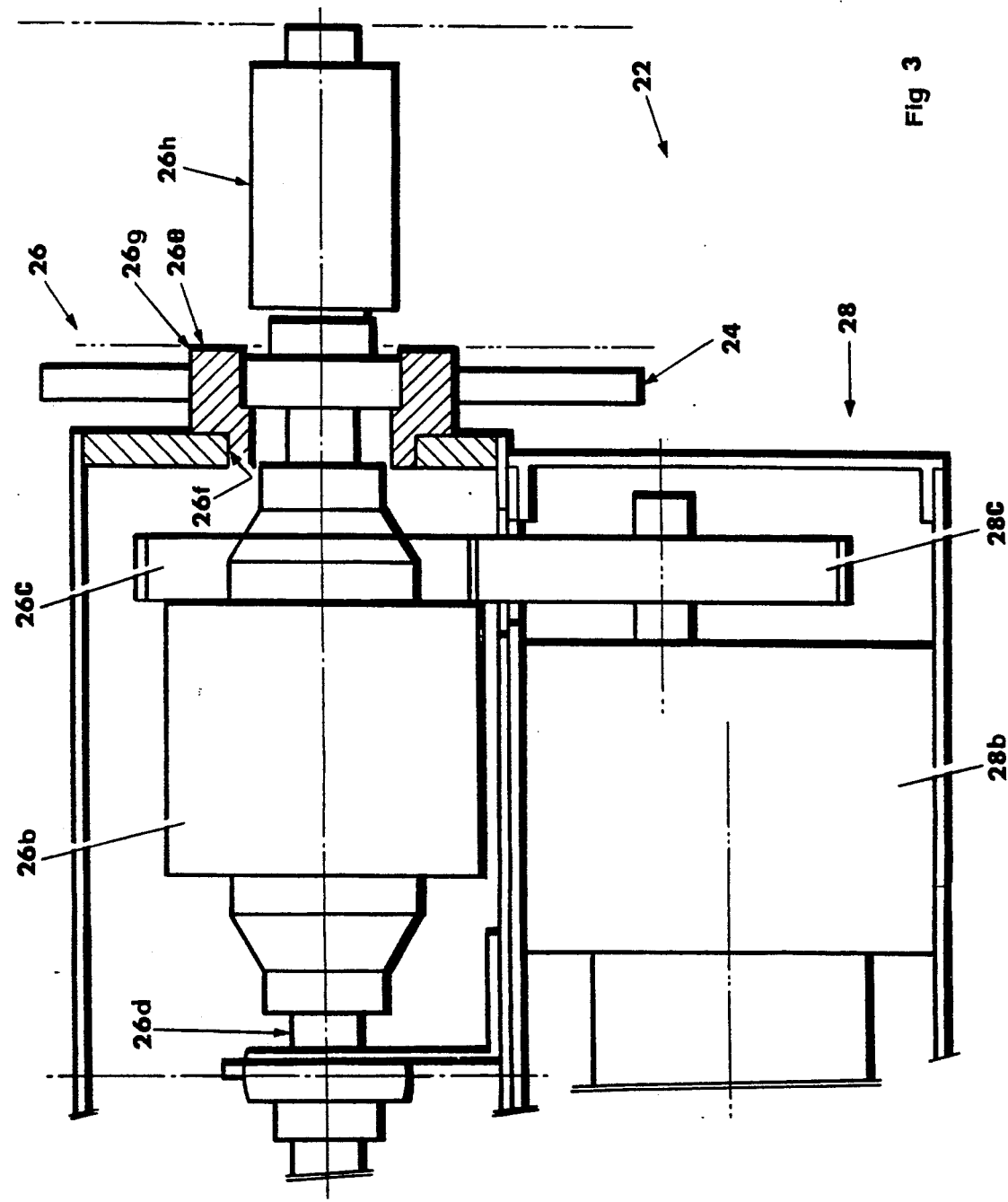

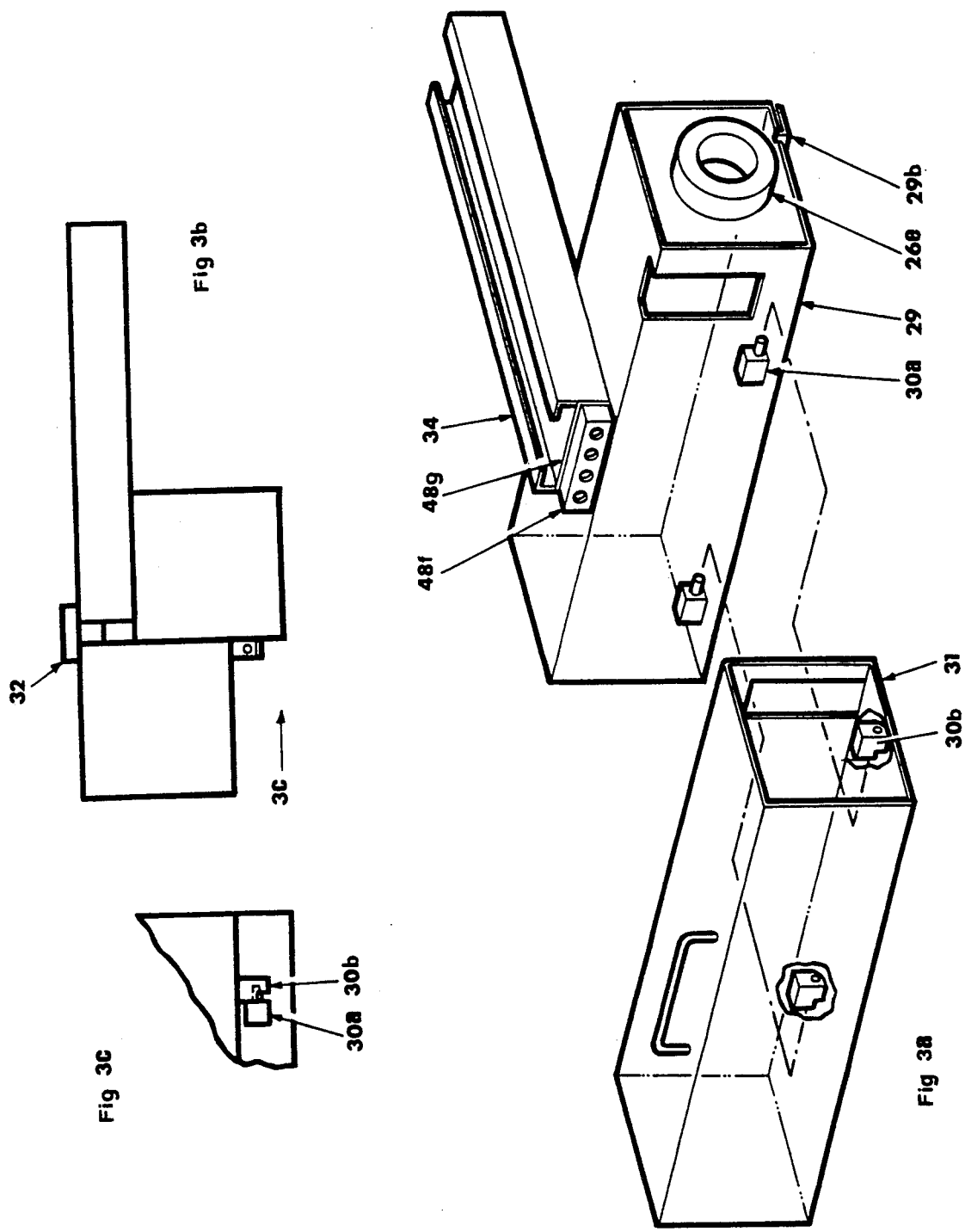

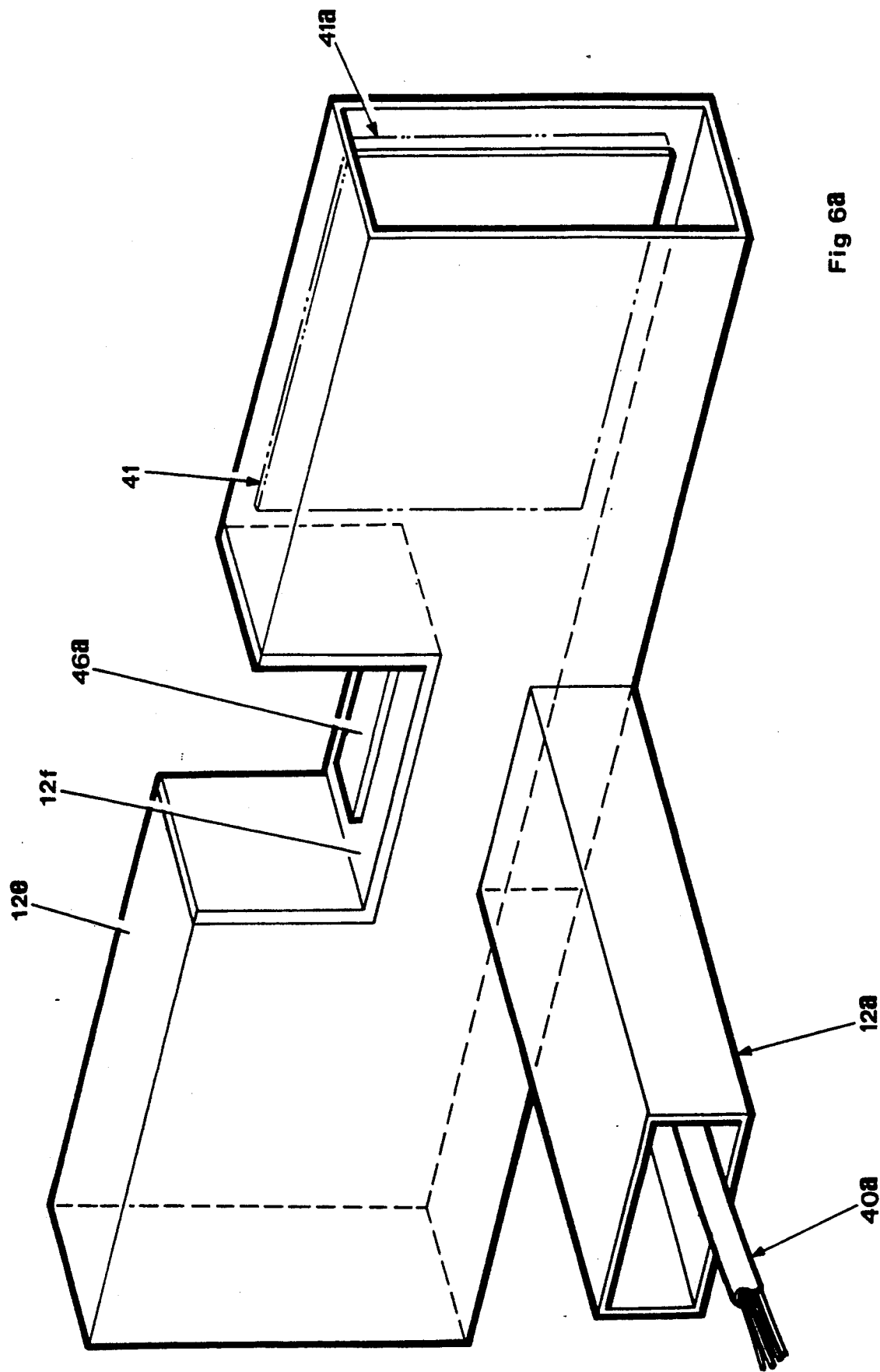

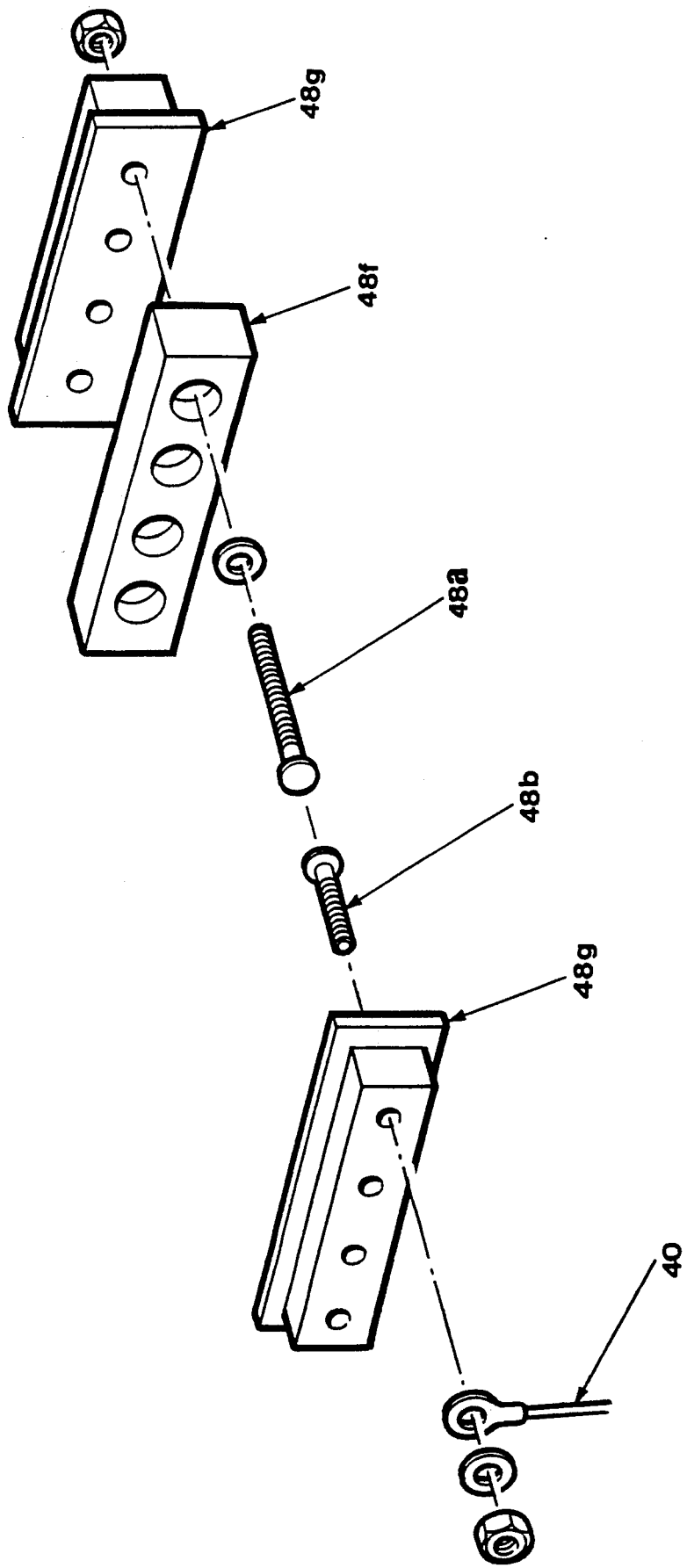

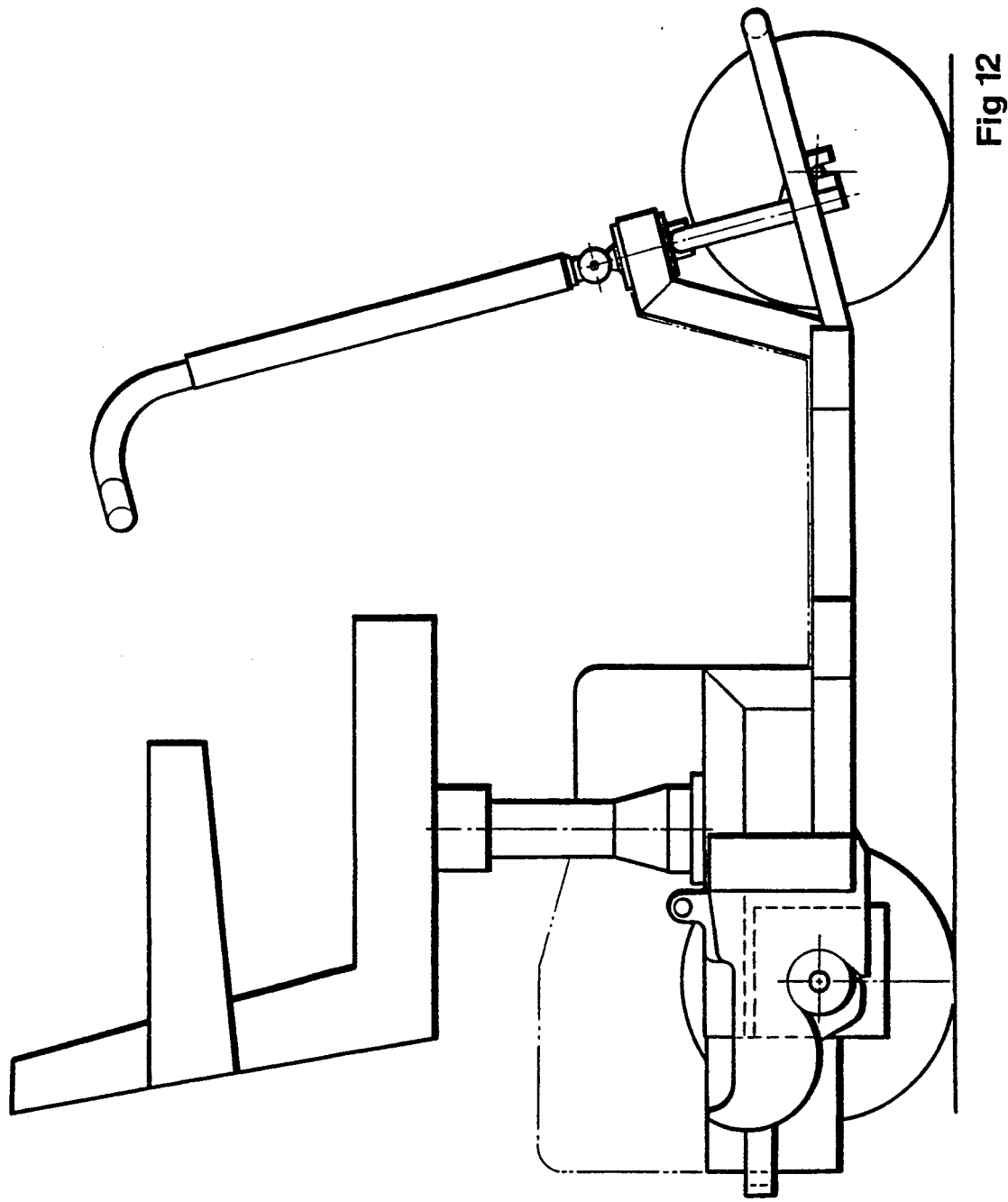

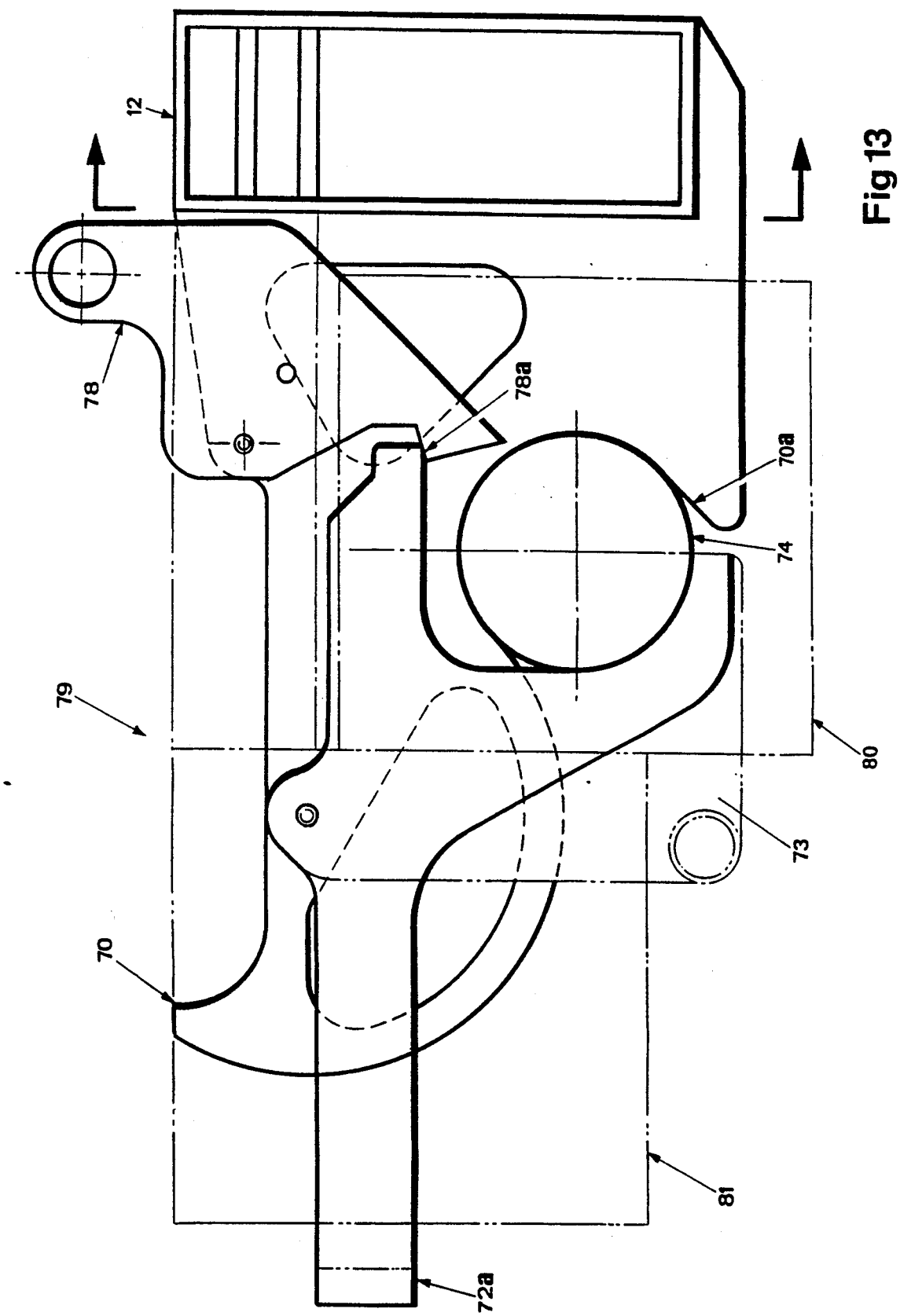

KNOCKDOWN MOTORIZED SCOOTER

The present invention relates to scooters.

Scooters have been existence for many years. One type of scooter has three wheels and is intended for users seeking assistance with their mobility. Some conventional scooters have a main frame which supports a front steerable wheel, a tiller, battery packs and a seat. A battery powered rear drive unit, carrying two driven wheels, is removably attached to the main frame. These conventional scooters may thus be dismantled into several components, the heaviest usually weighing in the forty to fifty pound range. These scooters have become popular in recent years because they can be dismantled, stored in the trunk of a car and reassembled for use in, for example, a shopping mall.

However, the assembly of the relatively heavy components can be complicated and requires a rather high degree of dexterity on the part of the user. Especially cumbersome is the connection of the main frame with the drive unit. In some cases, this connection requires that the scooter frame be balanced on the front wheel with one hand while the rear end is simultaneously manipulated into place with the other hand.

The techniques used in connecting the drive unit with the main frame generally involve a mechanical coupling which results in the weight of the main frame being transferred indirectly to the rear wheels through the structure of the drive unit. The forces directed through this structure are intensified once the user sits on the main frame. There remains the risk of injury to the user with this arrangement since inadvertent release of the connection or failure of the structure may cause an abrupt separation of the drive unit from the main frame and resulting in possible injury to the user.

Another difficulty concerns the connection of the electrical harnesses between the batteries, and between the batteries, and the drive unit. Quite often, these connections require keyed alignment and considerable assembly/disassembly forces.

It is also well known that conventional scooters are designed for the average user and thereby provide little adjustment for shorter or taller users. For example, the length of the tiller is usually fixed and the seat is often not adjustable relative to the main frame, resulting in an awkward tiller position for a significant number of users.

It is therefore an object of the present invention to provide a novel scooter which obviates some of the above disadvantages.

Briefly stated, the invention involves a scooter comprising a main frame supporting a steerable front wheel and a drive unit removably coupled to said main frame, said drive unit including a drive portion supporting a pair of driven rear wheels and a motor portion, coupling means for removably coupling said drive portion with said motor portion and separable power transmission means for transferring power from said motor portion to said drive portion.

In another aspect of the present invention, there is provided a scooter comprising a main frame supporting a steerable front wheel, a drive unit including axle means supporting a pair of driven rear wheels, said main frame further including coupling means to couple said main frame with said drive unit; said coupling means includes bearing means disposed on said drive means and abutment means disposed on said main frame, said abutment means arranged to engage said bearing means, transfer means to transfer said drive unit and said main frame from a disengaged position on a floor surface to an engaged position with said abutment means engaged with said bearing means; releasable securing means to secure said abutment means and said bearing means in said engaged position.

In another aspect of the present invention, there is provided a method of assembling a scooter of the type having a main frame supporting a steerable front wheel and a drive unit with an axle assembly carrying a pair of driven rear wheels, the method comprising the steps of:
providing an abutment surface on said main frame,
providing a bearing surface on said drive unit,
providing a transfer arrangement on said drive unit and said main frame to transfer said drive unit and said main frame from a disengaged position lying on a floor surface to an engaged position wherein said abutment surface is engaged with said bearing surface.
securing said drive unit and said main frame in said engaged position.

In yet another aspect of the present invention, there is provided an electrical contact assembly comprising a block of electrically insulating material, a sealing element, a contact to be held by said block, said contact having a head and a shank, said block and sealing element having a bore to receive said shank, the bore of said sealing element being widened on one side to counterbore said head therein, said block shaped to be received by a frame member while electrically isolating said contact therefrom, said seal element arranged to seal said head when in abutment with another contact.

In still another aspect of the present invention, there is provided an extensible shaft assembly, comprising a shaft element, a cylindrical element arranged to engage in a telescoping manner with said shaft element, said cylindrical element having an outer surface, a pair of abutments in contact with said outer surface, means for displacing said abutments to urge said cylindrical element toward contact with said shaft in such a manner to prevent relative displacement between said shaft element and said cylindrical element.

Several embodiments, given by way of example only, will be described with reference to the appended figures, in which:

FIG. 3 is a partial sectional view of one portion of the scooter illustrated in FIG. 1;

FIG. 3a is a fragmentary perspective view of several components illustrated in FIG. 3;

FIG. 3b is a schematic side view of the components of FIG. 3a assembled;

FIG. 3c is an end view taken on arrow 3c of FIG. 3b;

FIG. 6a is a fragmentary perspective view of several components illustrated in FIG. 5;

FIG. 7 is an assembly view of yet another portion of the scooter illustrated in FIG. 1;

FIG. 12 is a side view of another scooter;

FIG. 13 is a schematic side view of a portion of the scooter illustrated in FIG. 12.

Figure 1:
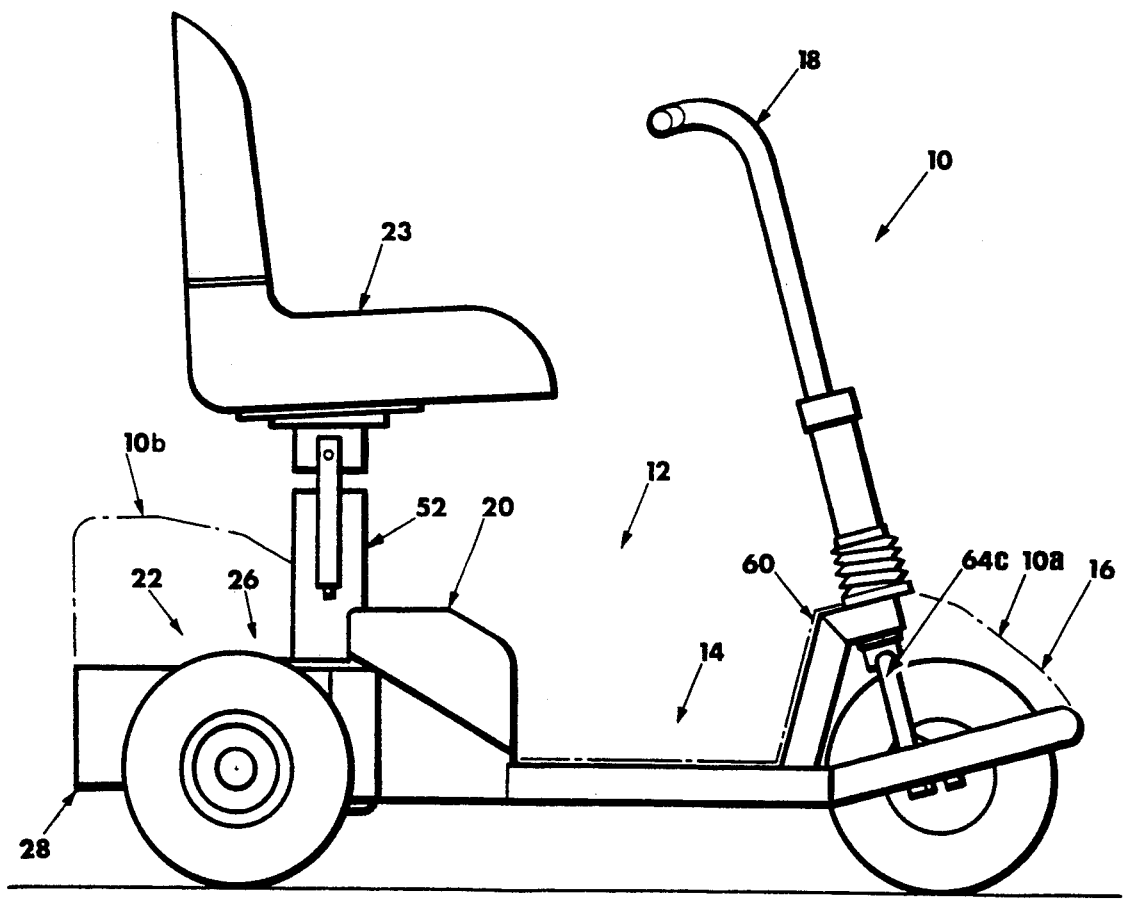
FIG. 1 is a side view of a scooter.
Figure 2:
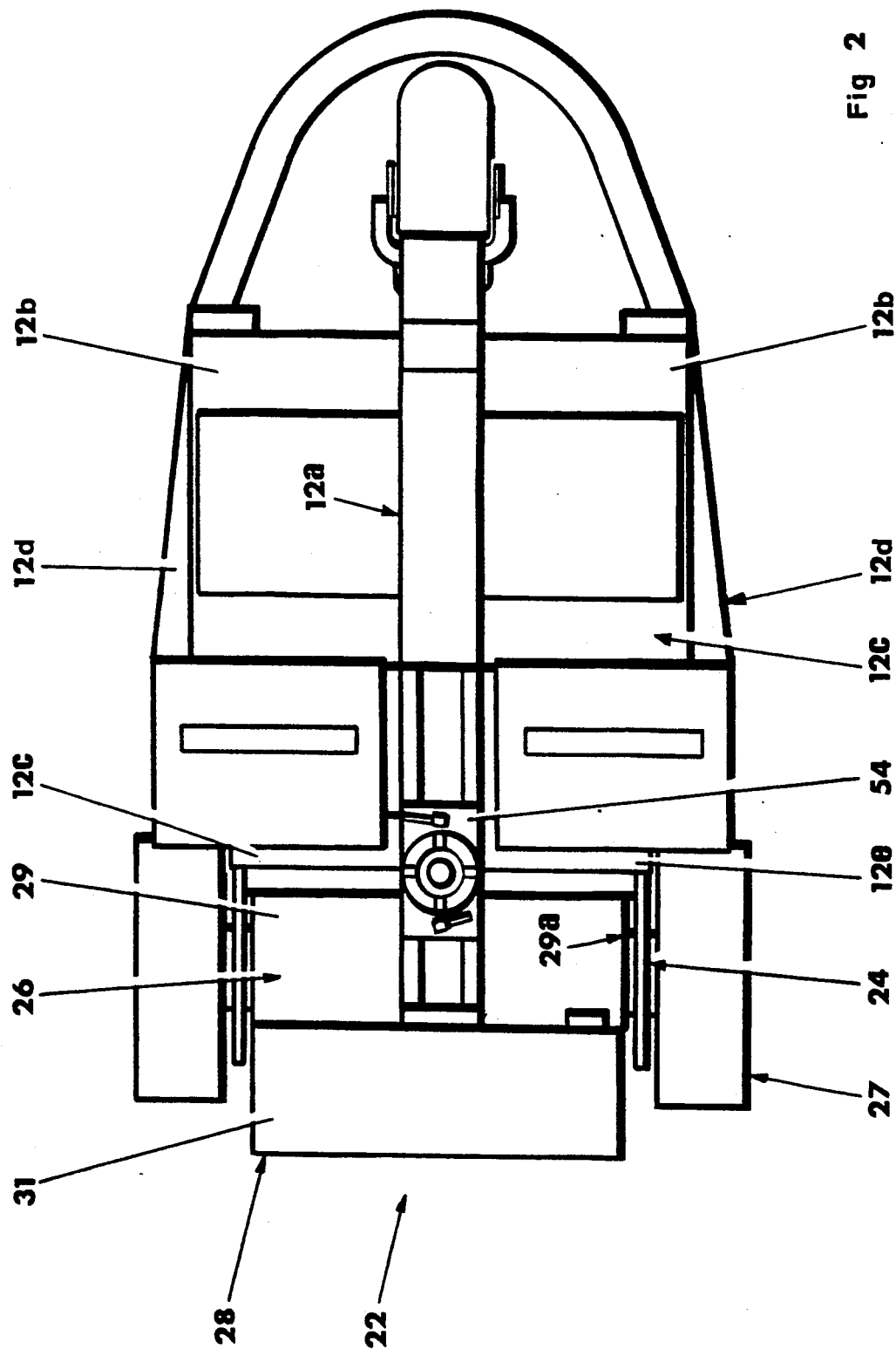
FIG. 2 is a plan view of the scooter illustrated in FIG. 1.

Referring to the figures there is provided a three wheeled scooter 10 having a tubular aluminum main frame 12 that supports a floor pan 14, a front wheel 16, a tiller 18 to steer the front wheel 16. Two battery packs 20 are coupled to the main frame 12 adjacent the floor pan 14. Once the drive portion 26 is separated from the main frame, the mounting flanges can easily be manually reset to the position required for the next cycle of assembly. A drive unit 22 is removably attached to the main frame 12. The drive unit also supports a seat 23 whose height and longitudinal position may be adjusted in a manner to be described below. The main frame 12 includes a central member 12a extending along the central longitudinal axis of the main frame 12 and is coupled to front and rear cantilevered members 12b and 12c and to a transverse cross tube 12e. The outer ends of the front cantilevered members 12b are joined to outer frame members 12d that extend back to the outer ends of the rear cantilevered members 12c. Attached to each outer end of the cross tube 12e is a abutment element in the form of a yoke member 24 with a downwardly oriented concave inner surface 24c to receive the outer surface of a corresponding bearing member on the drive unit 22 as will be described.

The scooter 10 is also equipped with front and rear shrouds 10a, 10b which are shown in chain-dot lines in FIG. 1.

The drive unit 22 is formed of a drive portion 26 and a motor portion 28. The drive portion 26 is enclosed in a drive housing 29. The motor portion 28 is enclosed in a motor housing 31 which is removably attached to the drive housing 29 by way of a pair of in-line lift off hinges 30, each including a hinge pin block 30a and a hinge block 30b, and a latch 32 as shown in FIG. 3a. Further provided on the drive portion 26 is a displacement member 34 used as a displacement means for displacing the drive portion 26 relative to the main frame 12 as will be discussed.

The displacement member 34 in one position is generally parallel with the floor pan. In this position, the member 34 serves the dual function of supporting the seat in a manner to be discussed and will thus be referred to as the seat support member 34. The seat support member 34 has a remote end which is engaged with a self-closing latch 36 which serves as a securing means to secure the drive unit with the main frame 12.

The drive portion 26 has a differential 26b with an transmission element in the form of an input gear 26c which emerges through an aperture in the rear face of the drive housing 29. The differential 26b is also coupled in known fashion with an axle assembly 26d. Both ends of the axle assembly 26d are rotatably mounted in bearing members 16e. Each bearing member 26e includes a portion held within an aperture 26f in the housing and another portion coaxially spaced therefrom and having an outer bearing surface 26g. The outer bearing surface 26g engages the inner surface 24a of the yoke member 24. Mounted on the remote end of each axle is a hub 26h to receive one of the rear wheels 27.

The motor portion 28 includes a motor shown schematically at 28b and a transmission element in the form of a gear 28c mounted on the drive shaft thereof. The gear 28c passes through an aperture on the front wall of the motor housing 31 and is complementary with the input gear 26c on the differential 26b.

A particular feature of the scooter 10 is the manner in which the drive unit 22 is connected with the main frame 12 through the use of a transfer means to transfer the drive unit and the main frame 12 from a disengaged position on a floor surface to an engaged position with the yoke members and bearing members in contact.

The drive housing 29 has a pair of outer faces 29a, each adjacent a corresponding wheel. Formed on each outer face 29a is one of a pair of a complementary transfer elements in the form of a mounting flange 29b which is arranged to receive another transfer element in the form of a pin 24b emerging from the inner surface 24a of the yoke member 24.

Figure 4A:
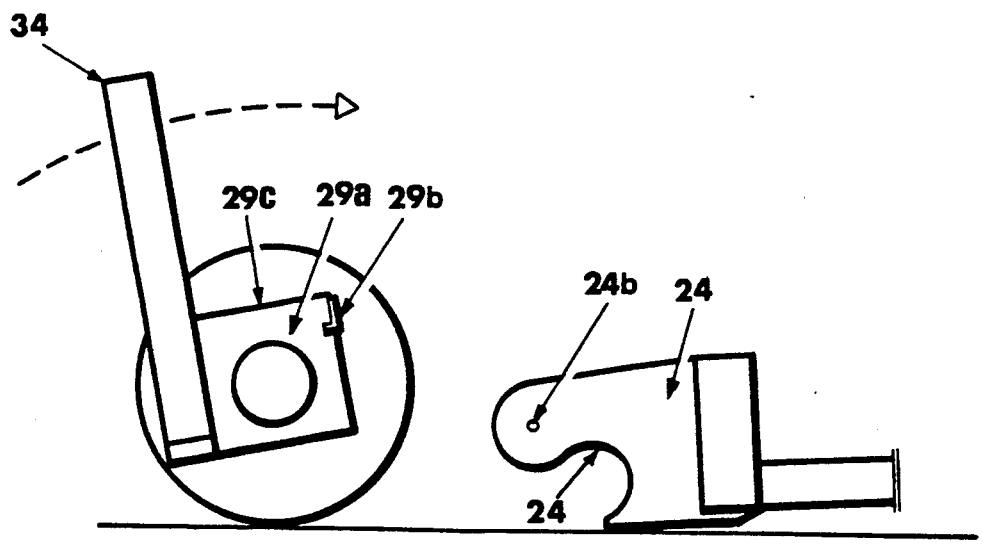
FIGS. 4a to 4l and 4p to 4s are schematic views of several components of the scooter illustrated in FIG. 1.
Figure 4B:
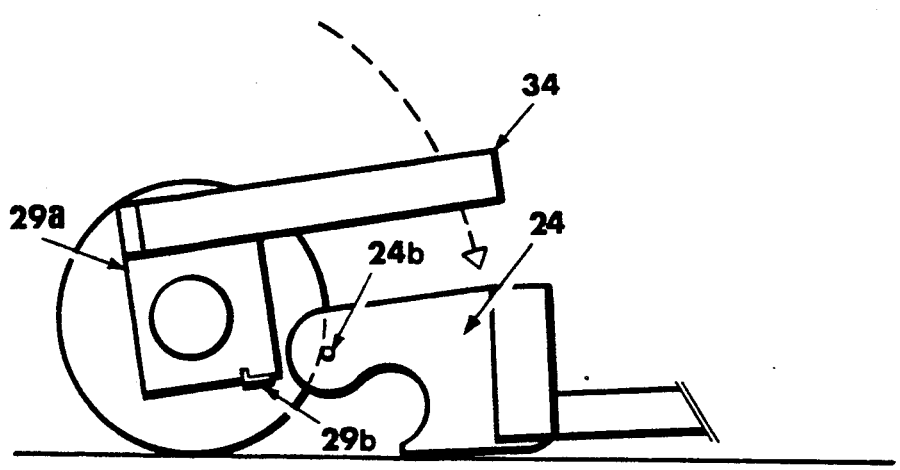
Figure 4C:
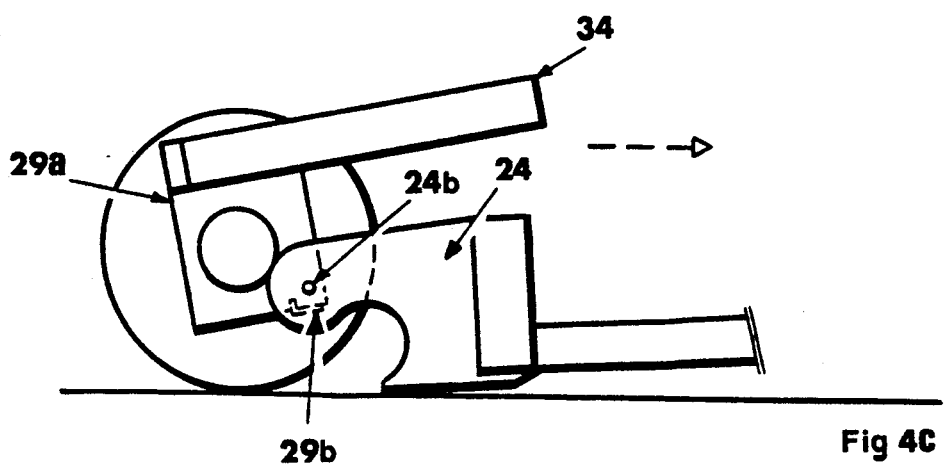
Figure 4D:
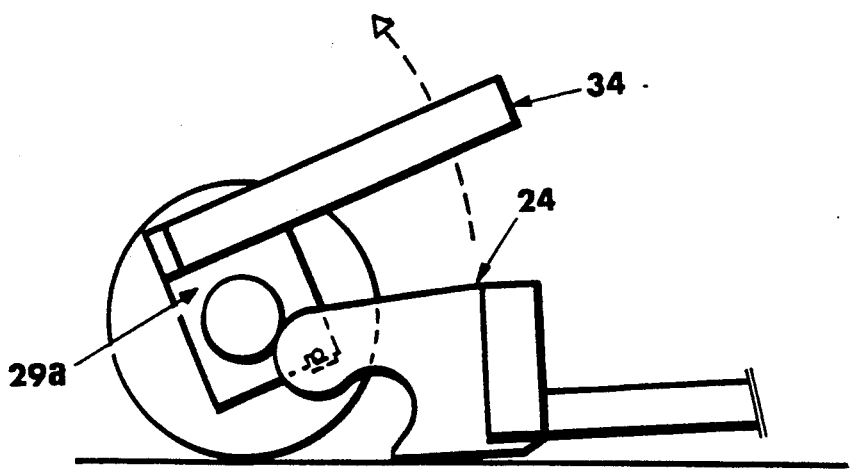
Figure 4E:
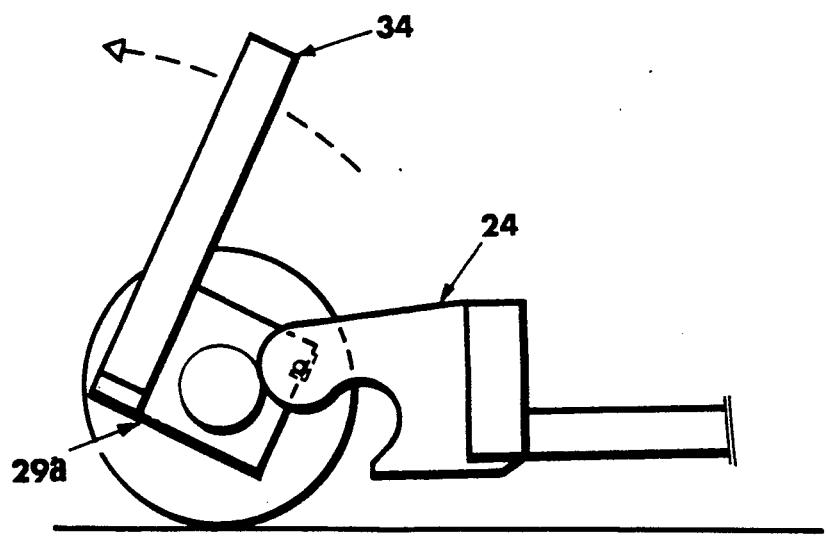
Figure 4F:
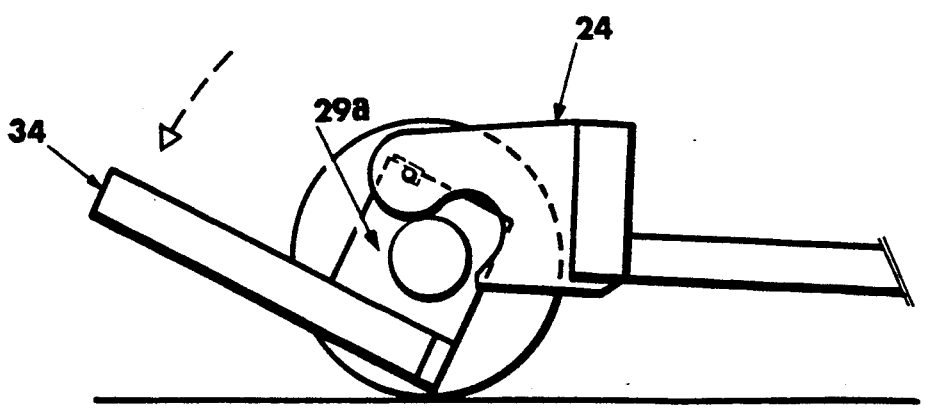
Figure 4G:
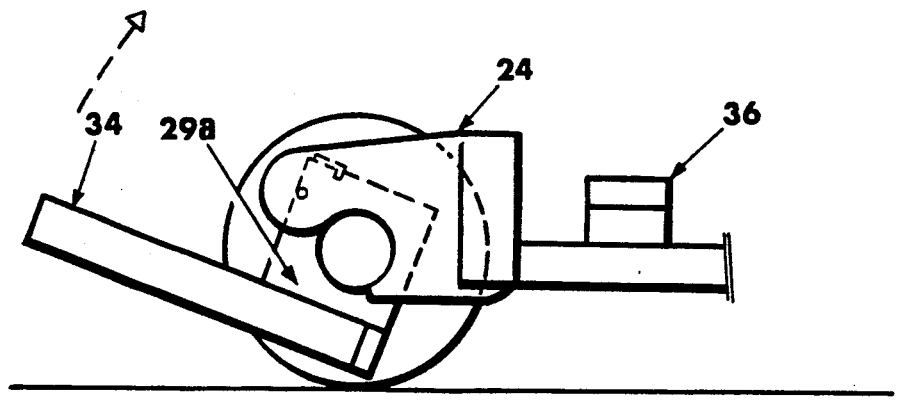
Figure 4H:
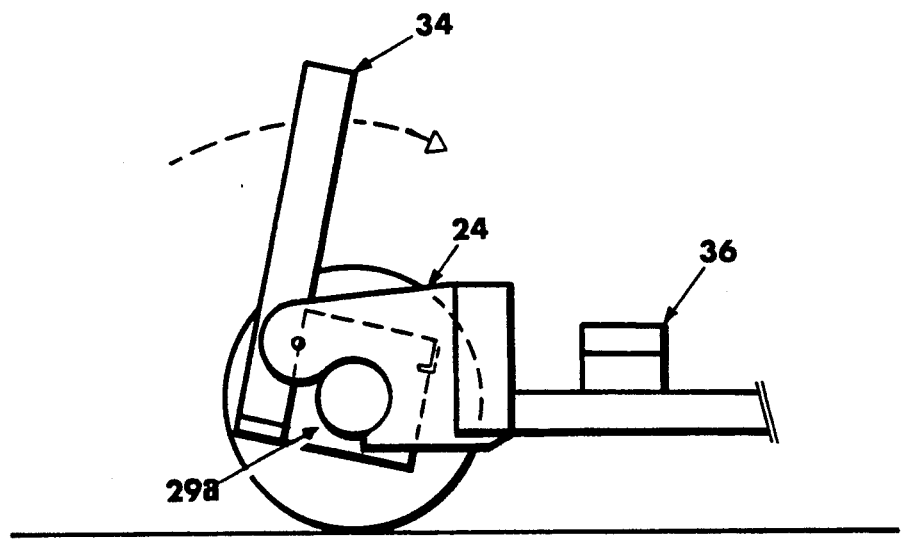
Figure 4I:
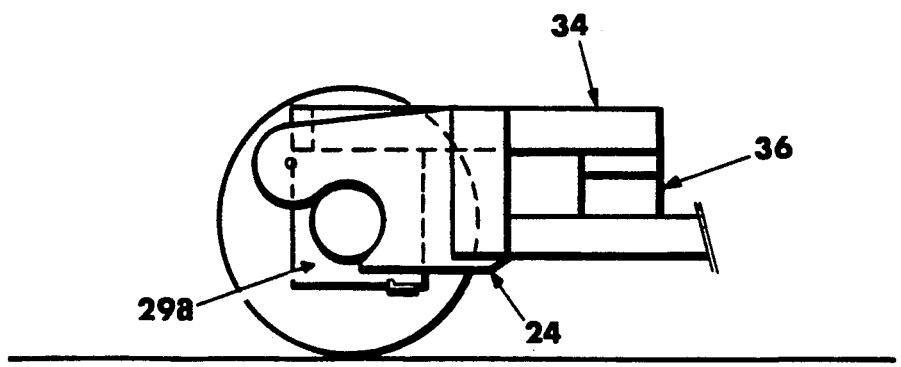
Figure 4J:
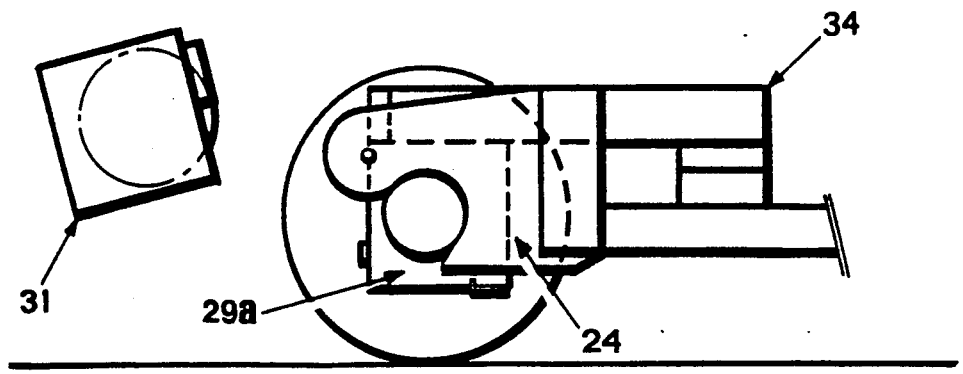
Figure 4K:
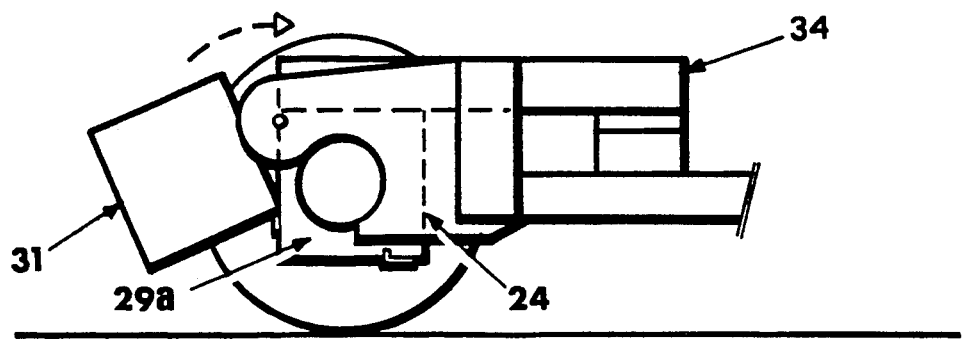
Figure 4L:
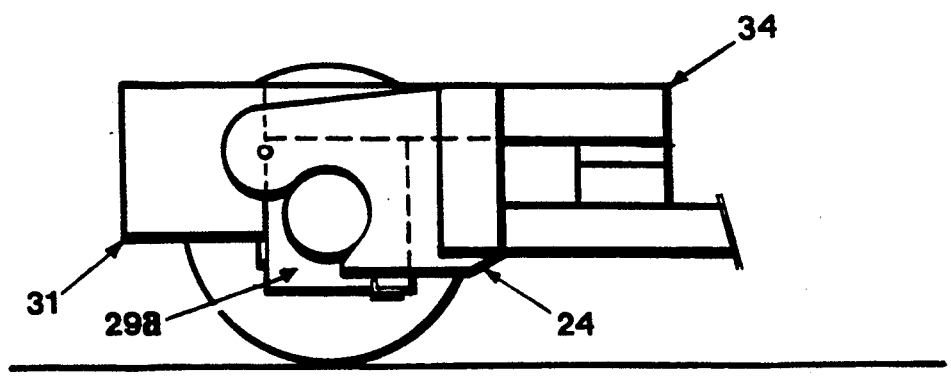

To connect the drive unit 22 with the main frame 12, the drive unit 22 is arranged on a floor surface so that each mounting flange 29b is aligned with a corresponding pin 24b as shown in FIGS. 4a through 4c. The seat support member 34 is then rotated rearwardly causing each mounting flange 29b to be displaced upwardly. In doing so, the mounting flanges 29b lift the yoke members by way of the pins 24b. Continued rotation of the seat support member 34 causes the inner surfaces 24a of the yoke members 24 to be engaged with the outer bearing surface 26g as shown in FIG. 4f. Thereafter, the seat support member 34 is returned to its initial position where it is fixed in place by the latch 36. The seat 23 may then be mounted on the seat support member 34 in a manner to be described below.

With the drive portion 26 mounted on the main frame 12, the motor portion 28 is then attached to the drive portion 26 by setting the two hinge blocks 30b of the motor case housing 31 onto the two respective hinge pin blocks 30a of the drive housing. The motor portion 28 is then slid sideways until the adjacent faces of the hinge blocks abut one another. The motor portion 28 is then rotated about the hinges until the adjacent faces of the motor portion 28 and the drive portion 26 are flush with each other. The motor portion is then secured to the drive portion by latch 32.

A particular advantage of the scooter is the ease with which the drive unit and the main frame 12 may connected. Rather than manipulating the drive unit with one hand and the main frame 12 with the other, the main frame 12 may be conveniently placed on the floor. Using the support member as a guiding handle, the user may then wheel the drive portion along the floor surface to align the mounting flanges with the pins. Then, the drive portion may be rotated slightly to engage the mounting flanges with the pins. The user may then rotate the support member in two steps:

i) rearwardly to bring the yoke members into engagement with the bearing surfaces;

ii) forwardly to lock the drive portion 26 in place via latch 36.

At no time did the user need to manipulate the main frame 12. Rather, the seat support member was used to rotate the drive unit which in turn displaced the yoke members toward their engagement with the bearing surfaces. At all stages of assembly, the main frame is inherently stable due to the fact that it experiences three point support; first, by the front wheel and the two yokes 24 being on the ground, second, by the front wheel and the two pins 24b, and lastly, by the front wheel and the two bearing surfaces 24a.

Thus, it will be seen that the drive unit and the main frame 12 are arranged so that only one, in this instance the drive unit, needs to be manipulated to connect both. In addition, in the case of the scooter 10, that manipulation is merely a rotation of the drive portion of the drive unit without the need to directly lift the drive unit or the main frame 12.

A further advantage of the scooter 10 is that the seat support member is arranged so that it is under the load of the user which makes inadvertent release of the drive unit from the main frame 12 virtually impossible, since for this to occur requires that the support member be rotated rearwardly.

Figure 4P:
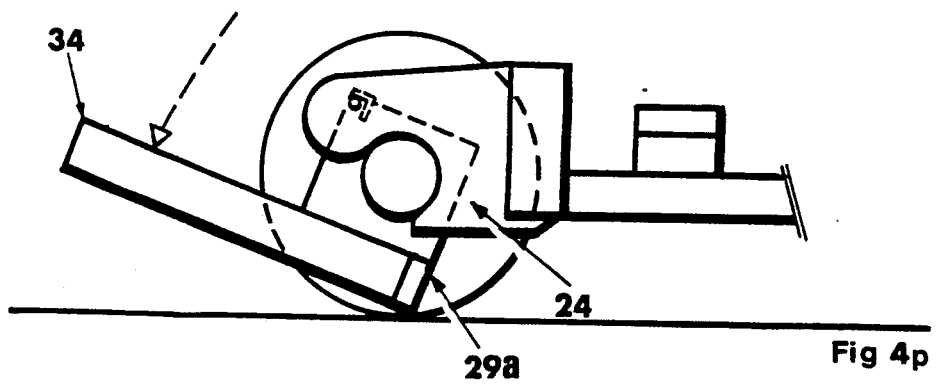
Figure 4Q:
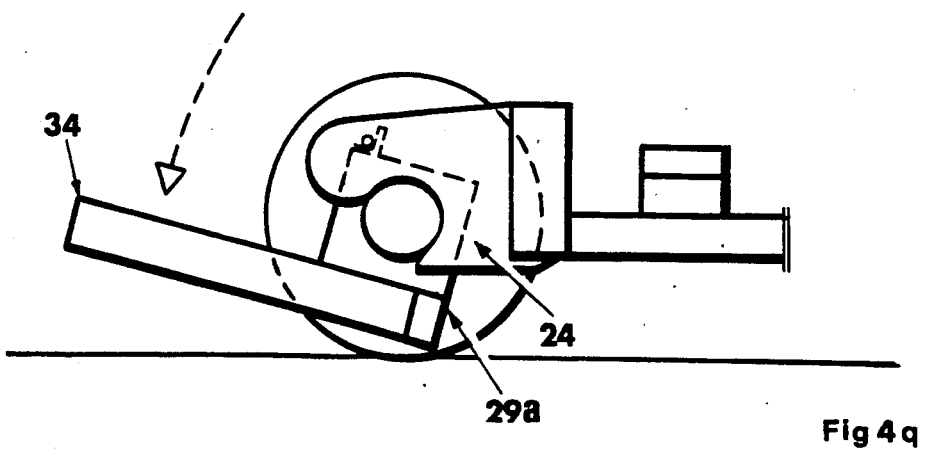
Figure 4R:
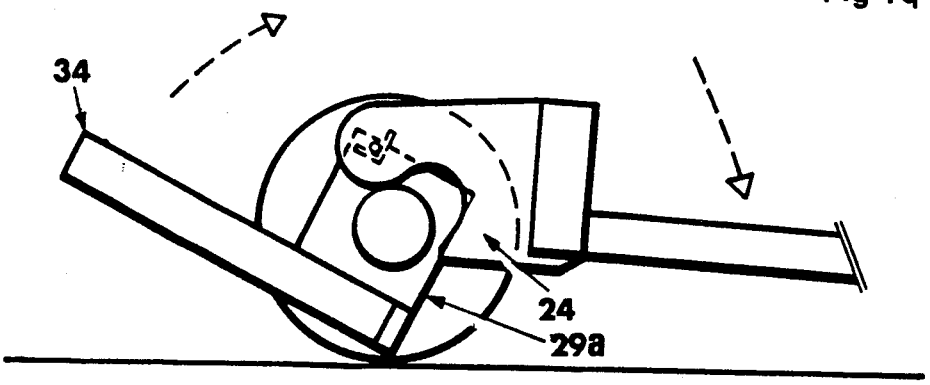
Figure 4S:
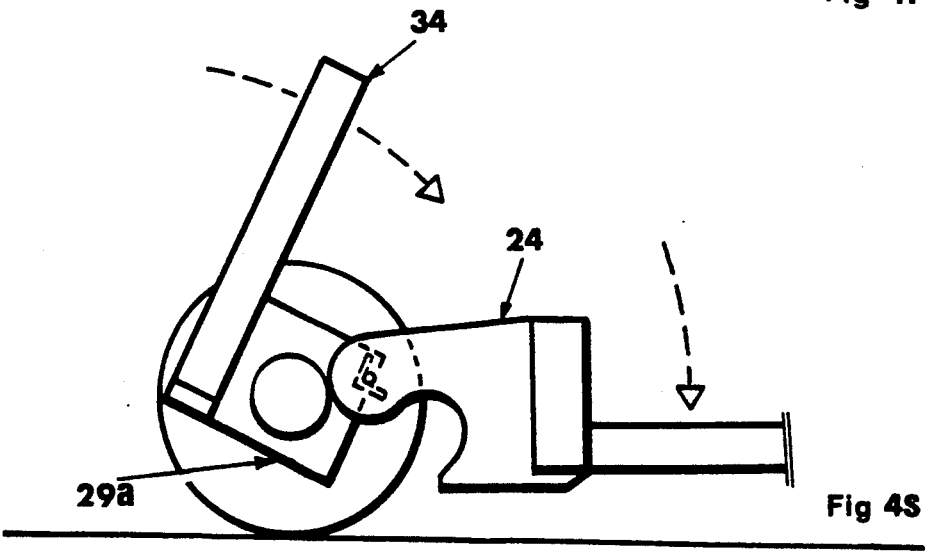

In another embodiment, the mounting flanges are arranged to permit the release of the drive unit by using the above mentioned steps in reverse. The seat is removed from the seat support member and the motor portion is removed from the drive portion. Then the latch 36 is released. The seat support member is rotated rearwardly until the mounting flange engages the pin as shown in FIG. 4p). Continued rearward rotation of the seat support member causes the mounting flange to toggle to the position shown in FIG. 4q). The seat support member is then rotated in the forward direction causing mounting flanges to displace the pins, thereby causing the yoke members to be come disengaged from the bearing members as shown in FIG. 4r). Continued forward rotation, as shown in FIG. 4s), results in the yoke members eventually reaching the floor surface. Once the drive portion 26 is separated from the main frame, the mounting flanges can easily be manually reset to the position required for the next cycle of assembly.

Another particular advantage of the scooter 10 is the ability to separate the drive unit into two smaller, and thus lighter, portions. It is this arrangement that permits the scooter to be broken down such that each component has a weight equal to or less than the weight of one of the battery packs 20. In addition, the use of gears, and the manner in which the gears extend through the apertures of the drive and motor housings, ensure that the drive and motor portions may be readily coupled together.

Power is supplied to the drive unit 22 from the battery packs 20 by means of a unique wiring harness 40. The scooter 10 has a controller shown at 41 in FIG. 6a which has a motor circuit (not shown) that controls the speed and direction of the scooter, and a motor brake release circuit that controls the motor brake commonly found on scooters.

Each battery pack 20 includes one battery enclosed in a battery pack casing 20a that is shaped to sit snugly within a frame pocket formed by a rear face of the outer frame member 12c and the top and front faces of the cross tube 12e. The battery pack casing 20a has a step 20b formed in the lower region of its front wall to facilitate the fit between the battery pack casing 20a and the frame pocket. A retractable spring plunger 42 is fixed to the top surface of the cross tube 12e and is arranged to engage with a latch 20c on the upper end of the rear wall of a contact protrusion 20d on battery pack casing 20a. The function of the plunger 42 and latch 20c is to prevent vertical and lateral displacement of the battery pack casing 20a during the operation of the scooter. In addition, the plunger 42 and the latch 20a allow the battery pack casing 20a to be lowered into the scooter frame and be automatically locked into position. The battery pack casing may be removed simply by retracting the plunger by way of a ring mounted on its remote end and by then lifting the battery pack from its frame pocket with an integral handle not shown.

A particular feature of the wiring harness 40 is the manner with which it connects the battery packs with the drive unit 22. This connection is achieved by way of three sets of electrical contacts, the first set 44 between the battery pack 20 and the main frame 12, a second set 46 between the main frame 12 and the drive portion 26 and the third set 48 between the drive portion 26 and the motor portion 28. It should be pointed out that where the figures illustrate only one contact there are in fact four contacts. Two are provided for the motor circuit and two are provided for the motor brake release circuit. One exception is the set 44 (of which there are two) where there are only two contacts, since these simply join the positive and negative posts of the battery to the controller.

It will be apparent from the following description that the electrical contacts are simple and economical to construct and are suited to the rugged environment of a scooter. The power wiring harness and control circuitry are protected from exposure to the elements and from possible damage through normal wear and tear. For example, the seat support member 34 has an integral conduit section 34a illustrated in FIG. 5a which contains the wiring harness 40 from the main frame 12 to the motor portion 28. In addition, the central member 12a contains another portion of the wiring harness illustrated at 40a in FIG. 6a which joins the controller 41 with the hand controls (not shown). The controller 41 is mounted on an aluminum block 41a which itself is attached to the inside wall of the cross tube 12e. This is significant in that the controller is not only protected from the elements, but the frame itself serves as a large heat sink for the controller which can effectively extend the operating life of the controller.

Figure 6:
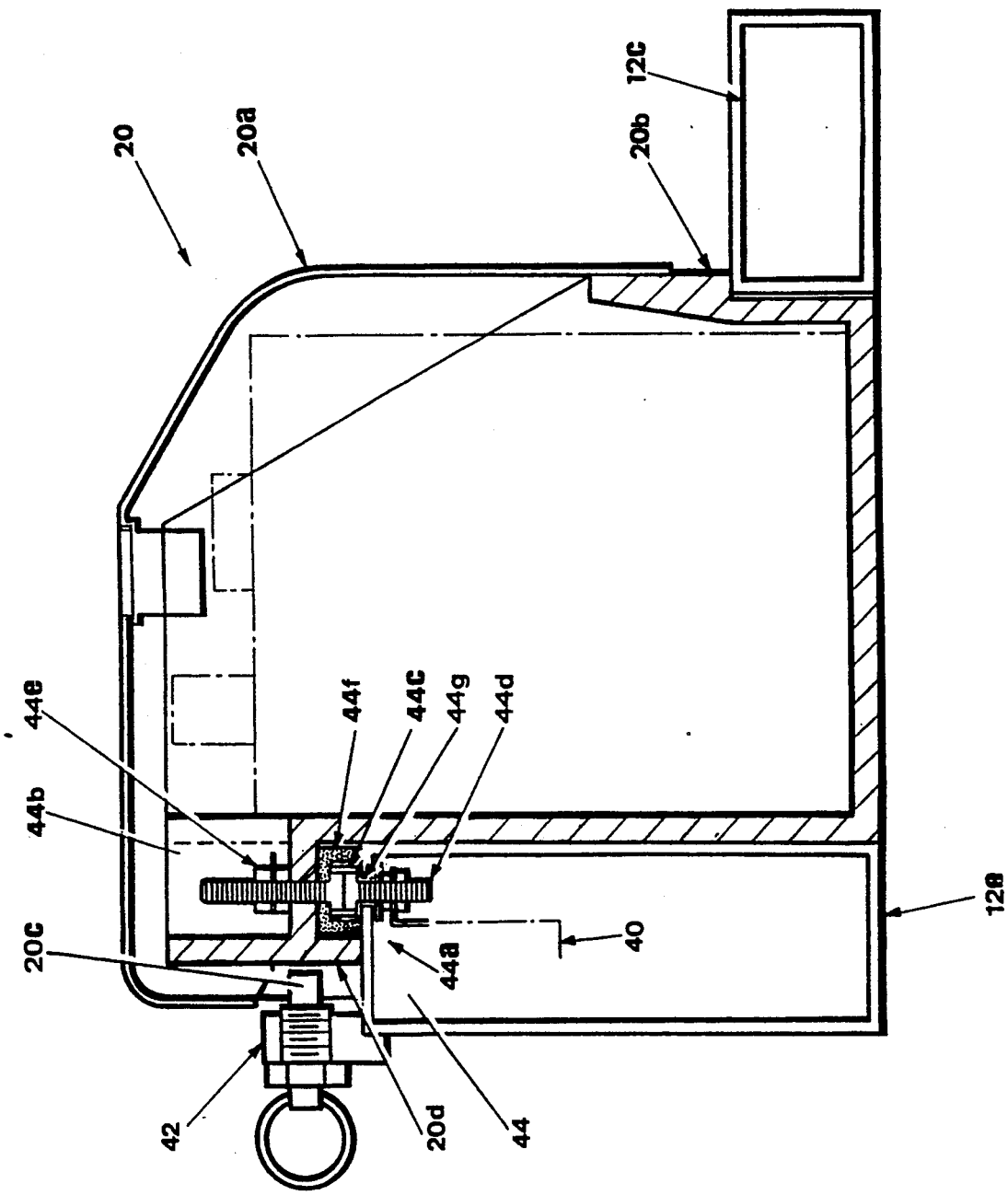
FIG. 6 is a partial sectional view of yet another portion of the scooter illustrated in FIG. 1.

Referring to FIG. 6, the first set 44 is formed from one contact 44a mounted on the upper wall of the cross tube 12e and another contact 44b mounted in the rear of the battery casing 20a. Each contact has a relatively large head 44c and a threaded shank 44d, the latter of which carries a pair of nuts 44e which secure an end of the wiring harness 40. The contact 44b is also provided with a resilient sealing element 44f, whose side wall is counterbored deeper than the height of the head 44c. As a result, the outer surface of the head 44b is recessed below the outer surface of the sealing element 44f. The sealing element is also shaped to provide spaces both on the inside and outside thereof for lateral expansion as will be described.

The battery casing 20a is formed of plastic material and therefore the contact 44b need not be electrically isolated therefrom. On the other hand, the rear cross tube 12e is formed from aluminum. Accordingly, the contact 44a is electrically isolated from the rear cross tube 12e by a plastic bushing shown at 44g.

Figure 5:
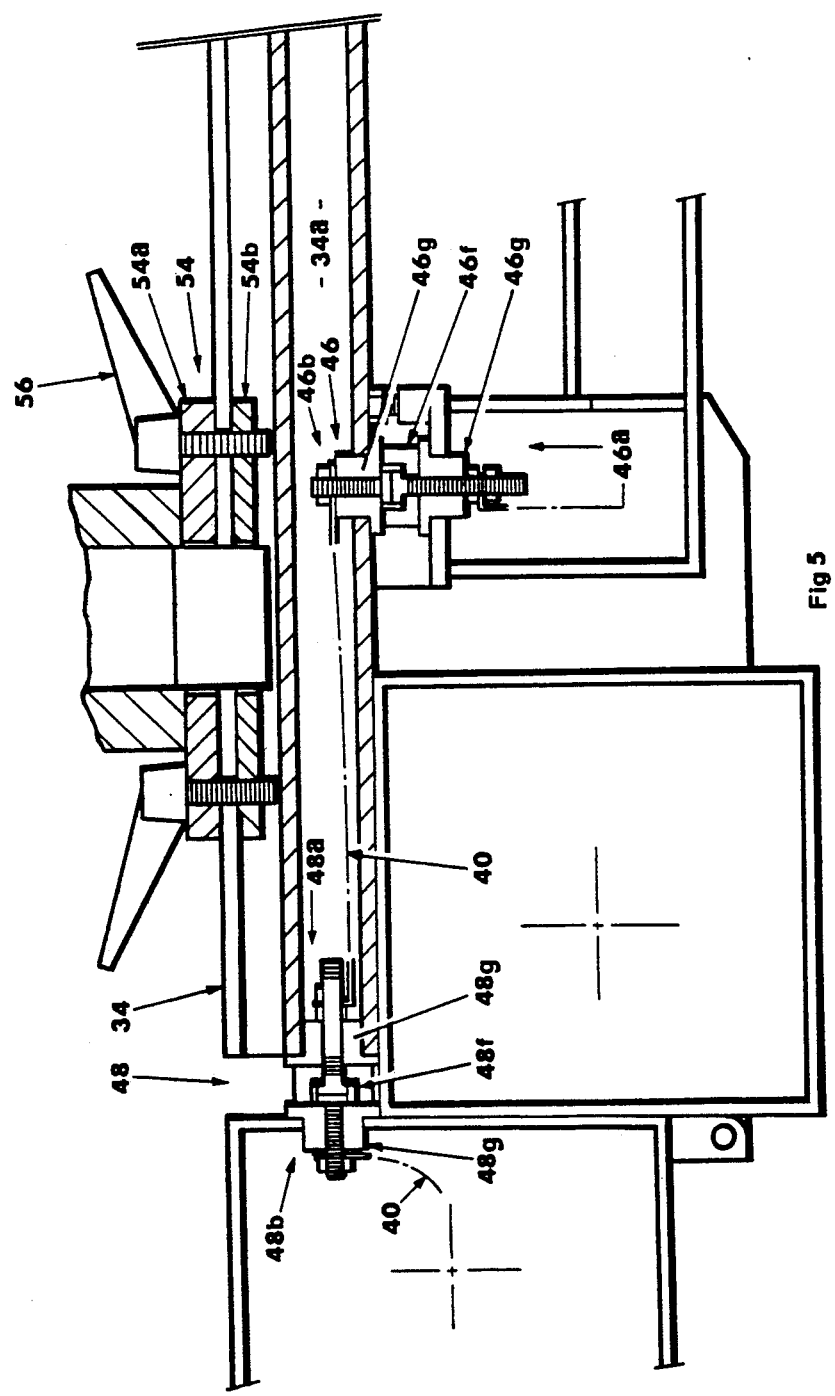
FIG. 5 is a partial sectional view of another portion of the scooter illustrated in FIG. 1.
Figure 5A:
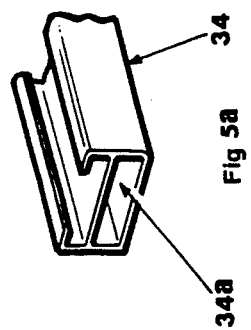
FIG. 5a is a fragmentary perspective view of one component illustrated in FIG. 5.

The battery terminals, not shown, are joined to the contact 44b while the wiring harness 40 is joined at one end to the contact 44a and at another end to a contact 46a of the second set as shown in FIG. 5. The contact 46a is also mounted in an intermediate horizontal wall of the cross tube 12e as shown in FIG. 6a at 12f. The contact 46a is further provided with a resilient sealing element 46f as earlier described and a plastic bushing 46g to electrically isolate the contact 46a from the cross tube 12e. The contact 46b is mounted on a bottom face of the seat support member 34 by way of a rectangular plastic bushing 46g which is held within a rectangular aperture in the seat support member 34. The bushing 48g is shaped to fit the inside surface of the conduit 34a. Therefore, to standardize the design of the contacts, the other bushings 46g are identical to bushing 48g and fit within correspondingly shaped rectangular apertures.

Another segment of the wiring harness 40 is joined at one end to the contact 46b and at another end to the contact 48a of the third set 48. Contacts 48a and 48b are also each mounted in a plastic bushing 48g while contact 48a is further provided with a resilient sealing element 48f. The contact 48b is wired to the leads of the motor 28b and the motor brake by way of another segment of the wiring harness 40.

The battery casing 20a is positioned in the frame pocket by inserting the front and rear surfaces thereof against the rear face of the cantilevered member 12c, and the rear protrusion thereof against the front and top faces of the cross tube 12e. As this is done, the contact 44b is lowered toward contact 44a until the sealing element 44f engages the region of the top surface of the cross tube 12e around the contact 44a. Continued displacement of the battery casing 20a causes the sealing element 44f to be compressed and thereby to expand into the adjacent spaces. The compression of the sealing element 44f further provides a spring action for the set 44b. As the displacement of the battery casing 20a continues, the plunger 42, in its extended position, engages the latch 20c. The compression of sealing element 44f ceases when the bottom face of the protrusion 20d abuts the top face of the cross tube 12e.

The contacts 44a, 44b are arranged so that the heads engage just prior to the alignment of the pin 24b with the latch 20c. This ensures a positive engagement to be maintained between the contacts 44a, 44b. Furthermore, the resilient ring 44f forms a snug seal with the upper face of the cross tube 12e to protect the electrical contacts from the environment.

In a similar fashion, the contacts of the second and third sets 46, 48 engage one another when the corresponding mating components engage. For example, when the seat member 34 engages the latch 36, the head of contact 46a abuts the head of contact 46b. Similarly, when the latch 32 is closed, the head of contact 48a abuts the head of contact 48b. Thus, the use of the contacts in each of the three sets 44, 46 and 48 permits a secure electrical contact to be established as the scooter 10 is assembled, thereby saving time and frustration. No manually assembled connector plugs are required.

Another particular advantage of the scooter 10 is that the contacts 44, 46 and 48 are arranged so they engage automatically with proper connection of the battery packs 20 with the main frame 12, the drive portion with the main frame 12 and the motor portion with the drive portion. As a result, an incomplete mechanical hook-up results in an improper electrical hook-up which produces an open drive circuit, thus preventing scooter operation and serving to alert the user that the mechanical hook-up is not secure. This arrangement virtually eliminates the risk of personal injury due to the errant user operating the scooter with an improper mechanical hook up.

The seat 23 is positioned by a height adjustable column 52 which is height adjustable by way of a pneumatic column and release assembly of the type conventionally used on office chairs slidably engaged to the seat support member 34 by way of a clamp 54. The clamp has a pair of surfaces, one of which is formed on a first portion 54a and the other of which is formed on a second portion 54b, the first and second portions 54a, 54b being held together by a pair of threaded members 56.

A particular feature of the seat 50 is the ability to infinitely adjust the longitudinal location of the seat 23 relative to the main frame 12, simply by adjusting the position of the clamp 54 relative to the support member 34.

Figures 8, 9, 10:
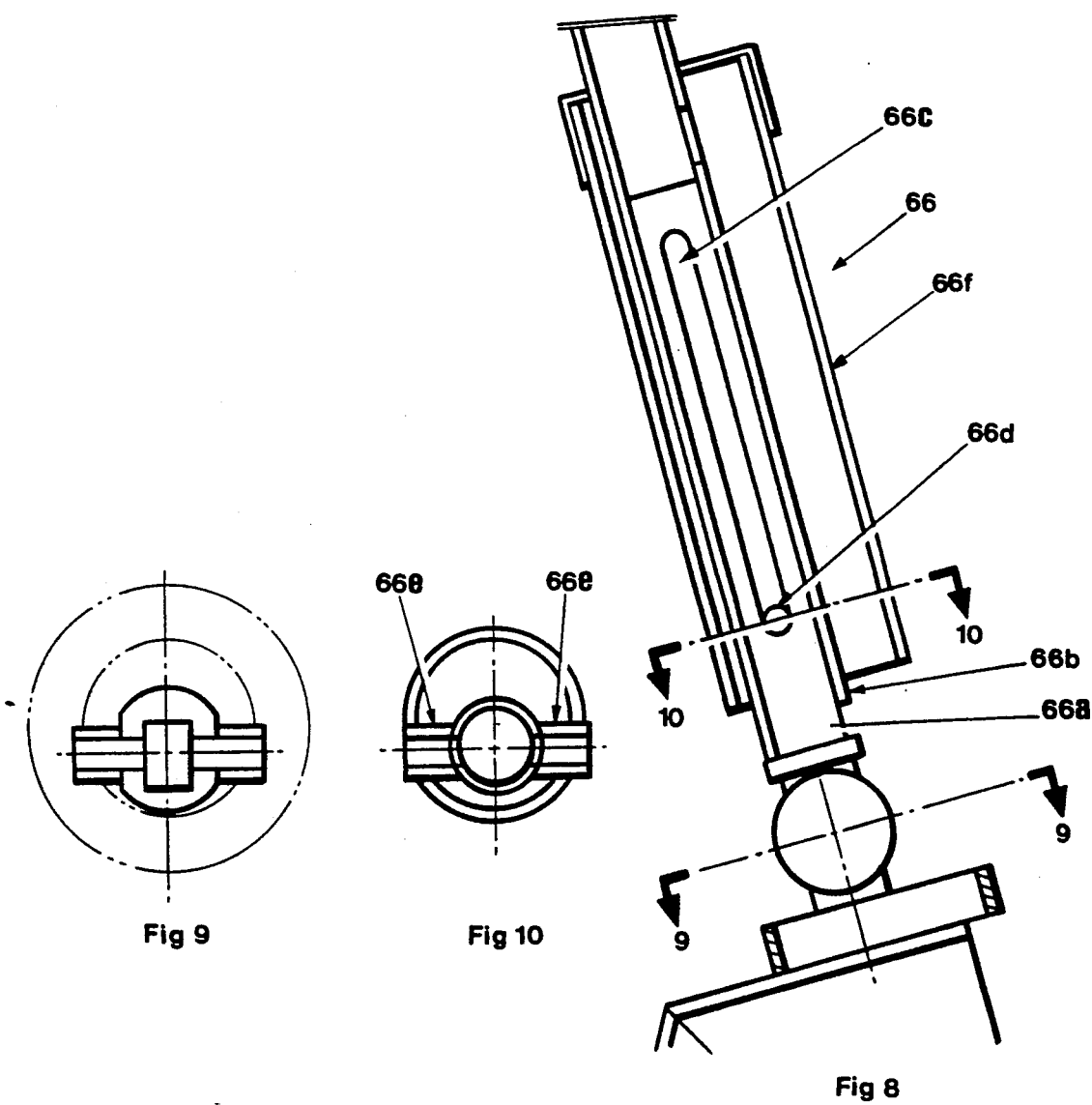
FIGS. 8 to 11 are various sectional views of yet another portion of the scooter.
Figure 11:
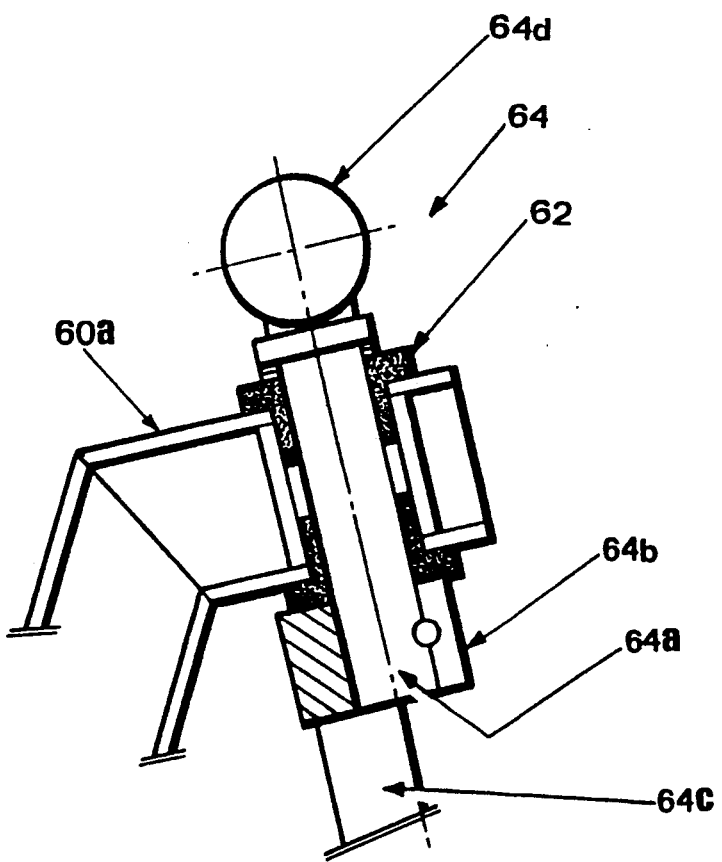

Upwardly extending from the front of the central member 12a member is a tiller support member 60. The tiller support member 60 terminates at a section 60a with a passage. Positioned in the passage is a bearing assembly 62 which in turn rotatably supports the lower tiller pivot assembly 64. The lower tiller pivot assembly 64 includes a bearing shaft 64a, a block 64b fixed to the lower end thereof and two forked members 64c fixed to the block 64b and arranged to support the hub of the front wheel 16. A serrated pivot assembly 64d (which is known and will not be described further) forms an integral part of the top of the lower pivot shaft 64a. The serrated pivot assembly 64d also forms an integral part of a upper pivot shaft 66a of a tiller shaft assembly. The tiller shaft assembly 66 includes an outer member 66b which is movable relative to the upper pivot shaft 66a. The upper pivot shaft 66a has an integral slot 66c and a clamp pin 66d, the latter of which, as shown in FIG. 10, (pin 66d has been removed from FIG. 10 for clarity) is mounted within a pair of collar members 66e abutting the outer surface of the outer member 66b. The clamp pin 66d compresses the collar members 66e against the outer member 66b causing it to deform and abut the outer surface of the upper pivot shaft 66a. By releasing this clamp pin, one can adjust the length of the tiller assembly to suit the requirements of the user.

Referring to FIGS. 12 to 14e, another mechanism is illustrated to connect the drive unit, shown at 79, to the main frame 12. As with the earlier example, a yoke member is provided at 70 on each end of the cross tube 12e. Pivoted to the inner surface of the yoke member 70 is a swing bracket 72 which is arranged to position the bearing surface 74 against the inner surface 70a of the yoke member 70. The swing brackets 72 are joined together by a lateral arm 72a with a handle, not shown, so that they swing together when the handle is lifted. The handle is used to pivot the main frame 12 as will be discussed. A spring loaded latch 78 is also pivoted to each yoke member 70 and has an operative end 78a which is arranged to engage an end portion on the swing bracket 72.

Figure 14A:
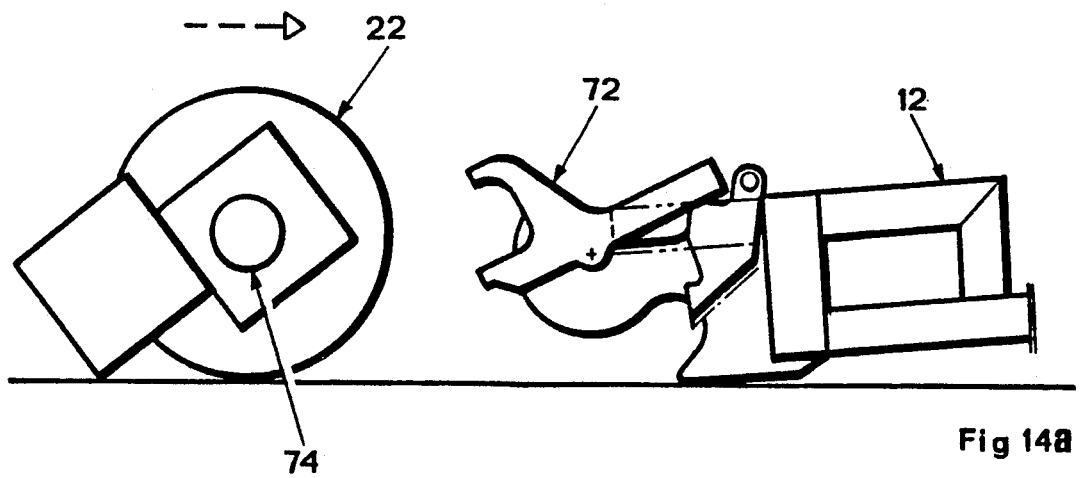
FIGS. 14a to 14e are schematic views of the portion illustrated in FIG. 13.
Figure 14B:
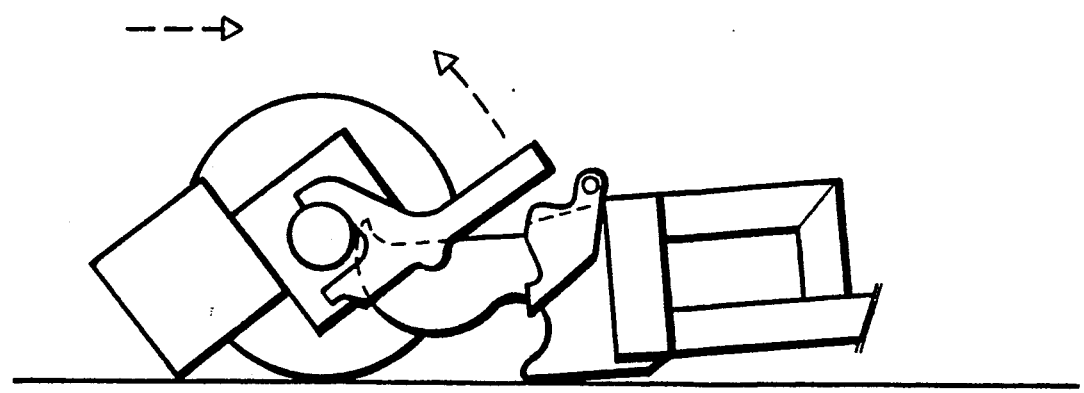
Figure 14C:
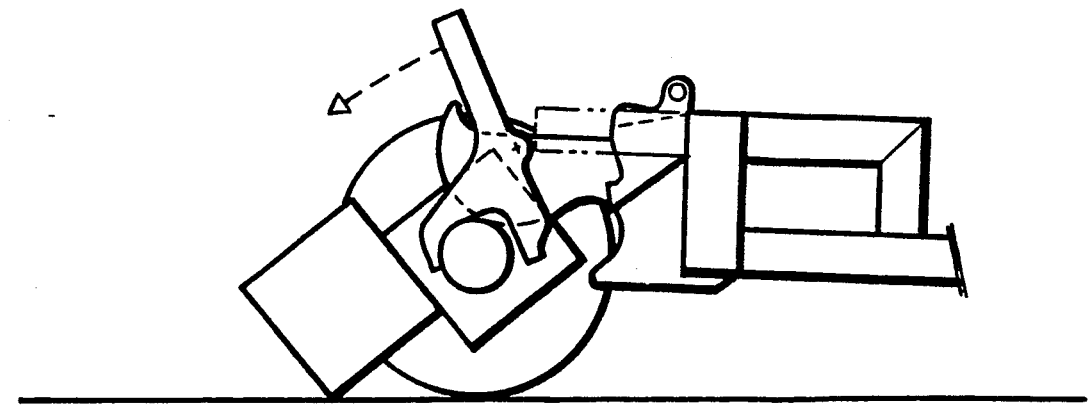
Figure 14D:
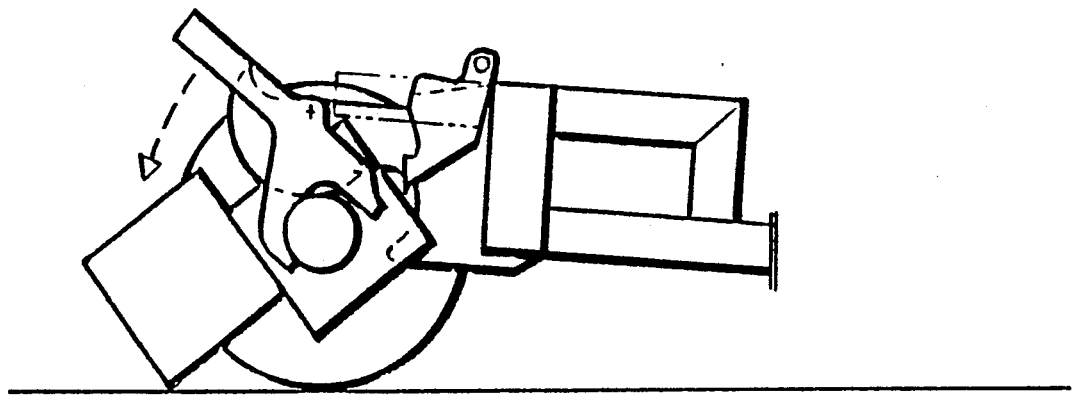
Figure 14E:
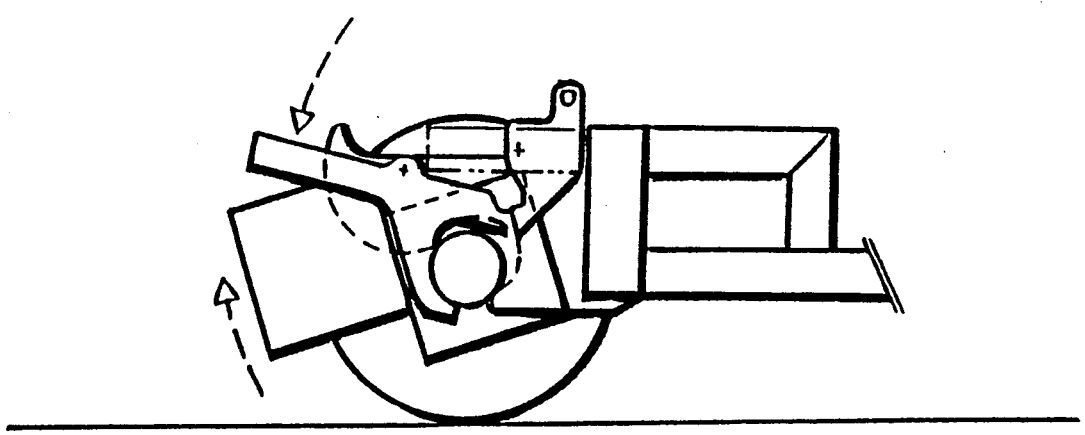

In use, the main frame 12 and the drive unit 79 are placed in position as shown in FIG. 14a. The swing bracket 72 is arranged so that it contacts the bearing surface 74. The arm 72 a is then rotated rearwardly causing the bearing surface 74 to travel along the lower surface of the yoke member, until the bearing surface 74 lies against the inner surface 70a of the yoke member 70, as shown in FIG. 14e. At the completion of rotation of arm 72a, the two latches 78 engage the end portions of the swing brackets 72.

The swing bracket 72 is designed so that the arm 72a lies outside the space occupied by both and the motor and drive portions 81, 80 of the drive unit 79. This permits the main frame 12 to be attached to the drive unit 79 with the motor portion 81 attached to the drive portion 80.

However, if desired, the arm 72a may be relocated to under the motor portion 81 as shown at 73 in chain dotted lines in FIG. 13. In this case, the main frame is first attached to the drive portion 80 and the motor portion 81 is thereafter attached to the drive portion via hinged connections as previously described.

This coupling arrangement is advantageous in that it permits the user simply to align the drive unit with the rear end of the main frame. It should be noted that, as with the earlier embodiment, only one component needs to be manipulated during the connection of the drive unit and the main frame. In this case, the main frame 12 is manipulated into place with the drive unit by rotation of the swing brackets. It should also be noted that the neither the main frame nor the drive unit need to be directly lifted during their connection. Rather, the yokes of the main frame merely need to be aligned with the bearing surfaces and the swing bracket rotated to connect the yoke members with the bearings.

While discussion thus far has been restricted to the use of yoke members on the main frame, they may instead be located on the drive unit and arranged to receive a corresponding bearing located on said main frame. In addition, one yoke member and one bearing member may be used instead of a pair of both as is discussed, provided a suitable stabilizing structure is provided to maintain the alignment of the drive unit with the main frame, providing that the bearing and abutment surfaces are arranged so that only one of the drive unit and the main frame need to be manipulated for their connection. For example, the bearing surface may, if desired, be formed on the outer surface of the drive unit housing.

It will also be understood that many of the components discussed herein above may conveniently be integrally formed together out of moulded plastic materials. For example, the bearing member 80e may be integrally formed with the end cover of the drive housing 29 out of moulded plastics materials.

The wiring harnesses may also be modified without detracting from the spirit of the invention. For example, the contacts need not have a threaded shank. This will depend on the type of fastener used to secure the wire lead thereto.

Where mention is made herein of 'floor surface' it is to be understood that the term 'floor' is to include within its meaning, any surface on which the scooter might travel, including that typically found outdoors and known as the 'ground'.

I claim:

1. A scooter comprising a main frame supporting a steerable front wheel and having a rear end, a drive unit including axle means supporting a pair of driven rear wheels, coupling means to couple the rear end of said main frame with said drive unit; said coupling means including bearing means disposed on said drive unit and abutment means disposed on said main frame near said rear end, said abutment means arranged to engage said bearing means, transfer means to transfer said drive unit and said main frame from a disengaged position with the rear end of said main frame lying on a floor surface, to an engaged position with said abutment means engaged with said bearing means; releasable securing means to secure said abutment means and said bearing means in said engaged position, said transfer means including a pair of complementary transfer elements, one of which is mounted on said drive unit and the other of which is located on said main frame, said transfer means further comprising displacement means for displacing one of said drive unit and said main frame relative to the other toward said engaged position.

2. A scooter as defined in claim 1 wherein two pairs of said transfer elements are provided, each pair located on a corresponding side of said scooter, each pair including a flange mounted on said drive unit and a pin mounted on said main frame.

3. A scooter as defined in claim 2 wherein said displacement means includes a displacement member mounted on said drive unit and arranged to rotate said drive unit from said disengaged position to said engaged position.

4. A scooter as defined in claim 3 further comprising a floor pan, a seat and support means for supporting said seat above said floor pan, said displacement member being generally parallel with said floor pan in said engaged position, said support means being removably mounted on said displacement member.

5. A scooter as defined in claim 4 wherein said scooter further includes a battery means and a wiring harness to transfer power from said battery means to said drive unit; said displacement member having a conduit therein to receive said wiring harness in order to protect said wiring harness.

6. A scooter as defined in claim 5 further comprising controller means, said controller means being enclosed in said main frame to protect said controller means.

7. A scooter comprising a main frame supporting a steerable front wheel and having a rear end, a drive unit including axle means supporting a pair of driven rear wheels, coupling means to couple the rear end of said main frame with said drive unit; said coupling means including bearing means disposed on said drive unit and abutment means disposed on said main frame near said rear end, said abutment means arranged to engage said bearing means, transfer means to transfer said drive unit and said main frame from a disengaged position with the rear end of said main frame lying on a floor surface, to an engaged position with said abutment means engaged with said bearing means; releasable securing means to secure said abutment means and said bearing means in said engaged position, wherein each of said bearing members has an outer surface, each of said abutment members includes a yoke member with a downwardly oriented concave surface to receive the outer surface of a corresponding bearing member, said transfer means includes a pair of bracket means, each pivoted to a corresponding yoke member, said bracket means being arranged to be rotated so as to transfer said yoke member from said disengaged position to said engaged position with said bearing member said bracket means having a surface to engage said outer surface opposite said yoke member.

8. A scooter comprising a main frame supporting a steerable front wheel and having a rear end, a drive unit including axle means supporting a pair of driven rear wheels, coupling means to couple the rear end of said main frame with said drive unit; said coupling means including bearing means disposed on said drive unit and abutment means disposed on said main frame near said rear end, said abutment means arranged to engage said bearing means, transfer means to transfer said drive unit and said main frame from a disengaged position with the rear end of said main frame lying on a floor surface, to an engaged position with said abutment means engaged with said bearing means; releasable securing means to secure said abutment means and said bearing means in said engaged position, said transfer means including a pair of complementary transfer elements, one of which is mounted on said drive unit and spaced from said bearing means and the other of which is located on said main frame and spaced from said abutment means, said transfer means further comprising displacement means for displacing one of said drive unit and said main frame relative to the other toward said engaged position.

* * * * *